United States Patent
Nagura et al.

(10) Patent No.: US 7,888,893 B2
(45) Date of Patent: Feb. 15, 2011

(54) CONTROL APPARATUS AND METHOD FOR LINEAR SYNCHRONOUS MOTOR

(75) Inventors: Hirokazu Nagura, Hitachi (JP); Hiromi Inaba, Hitachinaka (JP); Toshifumi Yoshikawa, Hitachinaka (JP); Hironori Ohashi, Narashino (JP); Yuri Takano, Narashino (JP); Masaki Sugiura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/715,716

(22) Filed: Mar. 2, 2010

(65) Prior Publication Data

US 2010/0181945 A1     Jul. 22, 2010

Related U.S. Application Data

(62) Division of application No. 11/215,553, filed on Aug. 29, 2005, now abandoned.

(30) Foreign Application Priority Data

Aug. 30, 2004  (JP) .............................. 2004-249856

(51) Int. Cl.
    *H02P 3/00*  (2006.01)
(52) U.S. Cl. .................... 318/135; 318/400.11; 318/372
(58) Field of Classification Search ................. 318/135, 318/400.11, 372
    See application file for complete search history.

(56) References Cited

U.S. PATENT DOCUMENTS

| | | |
|---|---|---|
| 4,556,836 A | 12/1985 | Antognini |
| 4,651,073 A | 3/1987 | Shimizu et al. |
| 5,210,562 A | 5/1993 | Miyazawa et al. |
| 5,320,421 A | 6/1994 | Kade et al. |
| 5,638,387 A | 6/1997 | Palleggi et al. |
| 6,469,463 B2 * | 10/2002 | Chen et al. ............. 318/400.23 |
| 6,696,813 B2 | 2/2004 | McManus et al. |
| 6,828,750 B2 * | 12/2004 | Nakazawa ................. 318/701 |
| 6,836,085 B2 | 12/2004 | Kawada et al. |
| 6,917,856 B2 | 7/2005 | Murata |
| 7,309,972 B2 | 12/2007 | Kranitzky et al. |

FOREIGN PATENT DOCUMENTS

| | | |
|---|---|---|
| JP | 06-092558 | 4/1994 |
| JP | 2001037285 A | 2/2001 |
| JP | 2003088165 A | 3/2003 |
| JP | 2003175432 A | 6/2003 |

OTHER PUBLICATIONS

Corresponding Japanese office action dated Aug. 25, 2009 with English translation.

* cited by examiner

*Primary Examiner*—Bentsu Ro
*Assistant Examiner*—David S Luo
(74) *Attorney, Agent, or Firm*—Crowell & Moring LLP

(57) ABSTRACT

The start timing of the pole position inference process of the linear motor installed vertically is delayed by a predetermined time after instruction of brake release. For example, from (1) increasing of the thrust instruction value of an ASR control system up to a predetermined value, (2) the movement (falling) distance of the moving part, or (3) the moving (falling) speed of the moving part, the release condition of the brake is detected and moreover after a predetermined time, the inference process of the pole position is started. The inference process of the pole position of a synchronous motor is fit to the release timing of a brake and a malfunction of the inference process and a runaway (falling in the vertical drive) of a moving part are prevented.

3 Claims, 10 Drawing Sheets

100 %
CONTROL APPARATUS AND METHOD FOR LINEAR SYNCHRONOUS MOTOR

This application is a divisional of U.S. patent application Ser. No. 11/215,553, filed Aug. 29, 2005, which in turn claims priority from Japanese Application No. 2004-249856, filed on Aug. 30, 2004. The entire disclosure of each of the above-identified applications is incorporated herein by reference.

FIELD OF THE INVENTION

The present invention relates to a control method and apparatus suitable for a linear synchronous motor and more particularly for a linear synchronous motor having a brake for stopping and retaining a moving part moving vertically.

BACKGROUND OF THE INVENTION

When driving a synchronous motor, pole position information is essential and mostly using a pole position detector, pole position information is obtained. However, for the purpose of saving the mounting space of the pole position detector and reducing the cost, an art requiring no pole position detector has been developed. For example, in Japanese Patent Laid-open No. 2003-88165, to a control apparatus for a synchronous motor formed as a speed control system, the same speed instruction is input twice, and the first instruction controls the motor only by a q-axial current, and the second instruction controls the motor only by a d-axial current. An art for inferring the pole position from a ratio of the magnitude between the q-axial current and the d-axial current when the speed is fixed is disclosed. Further, the patent document describes that when a runaway is detected during the inference process of the pole position, the speed instruction is instantaneously reduced substantially to zero, and in a motor having a brake, the brake is applied.

SUMMARY OF THE INVENTION

In the prior art aforementioned, for example, in a system using a brake having a large operation delay, the inference process is started in the state that the brake is still being applied and a problem arises that the pole position cannot be inferred normally. Further, when the brake response is fast inversely, particularly in a system driving vertically, when the brake is released excessively earlier than the inference process of the pole position, a danger of falling (runaway) is accompanied. Moreover, since detection itself of falling (runaway) is executed during the inference process of the pole position, the detection of the falling (runaway) condition is delayed and a problem arises that an increase in the moving part falling (runaway) distance is caused.

In an aspect of the present invention, an inference process of the pole position is started at timing after a brake release instruction is issued to the brake for stopping and retaining the moving part of the synchronous motor.

In a preferred embodiment of the present invention, the release of the brake is instructed, and then after a predetermined time lag, the inference process of the pole position is started.

In another preferred embodiment of the present invention, using a speed control system (ASR control system) for the synchronous motor, a speed instruction $\omega_M{}^*$ thereof is practically reduced to 0, and when a thrust instruction value $T^*$ obtained by the ASR control system reaches a predetermined value $T_r$ or after a lapse of a predetermined time after the instruction value reaches the predetermined value $T_r$, the inference process of the pole position is started.

Furthermore, in still another preferred embodiment of the present invention, when the movement (falling) distance $\theta_r$ of the moving part of the synchronous motor or the movement (falling) speed $\omega_r$ reaches a predetermined value or after a lapse of a predetermined time after it reaches the predetermined value, the inference process of the pole position is started.

According to the preferred embodiments of the present invention, regardless of differences in the release time of an individual brake, the lubrication condition of the rail at each stop position, and the release time due to a change with time, the pole position inference process can be started simultaneously with release of the brake.

Further, failure in the pole position inference due to start of the inference process in the state that the brake is still being applied, excessive falling (movement) of the moving part due to impossible immediate start of the pole position inference process after release of the brake, and failure in the pole position inference due to it can be prevented.

Other objects and features of the present invention are described hereunder along with preferred embodiments.

DESCRIPTION OF THE PREFERRED EMBODIMENTS

Hereinafter, the detailed embodiments of the present invention will be explained with reference to the accompanying drawings.

Figure 1:
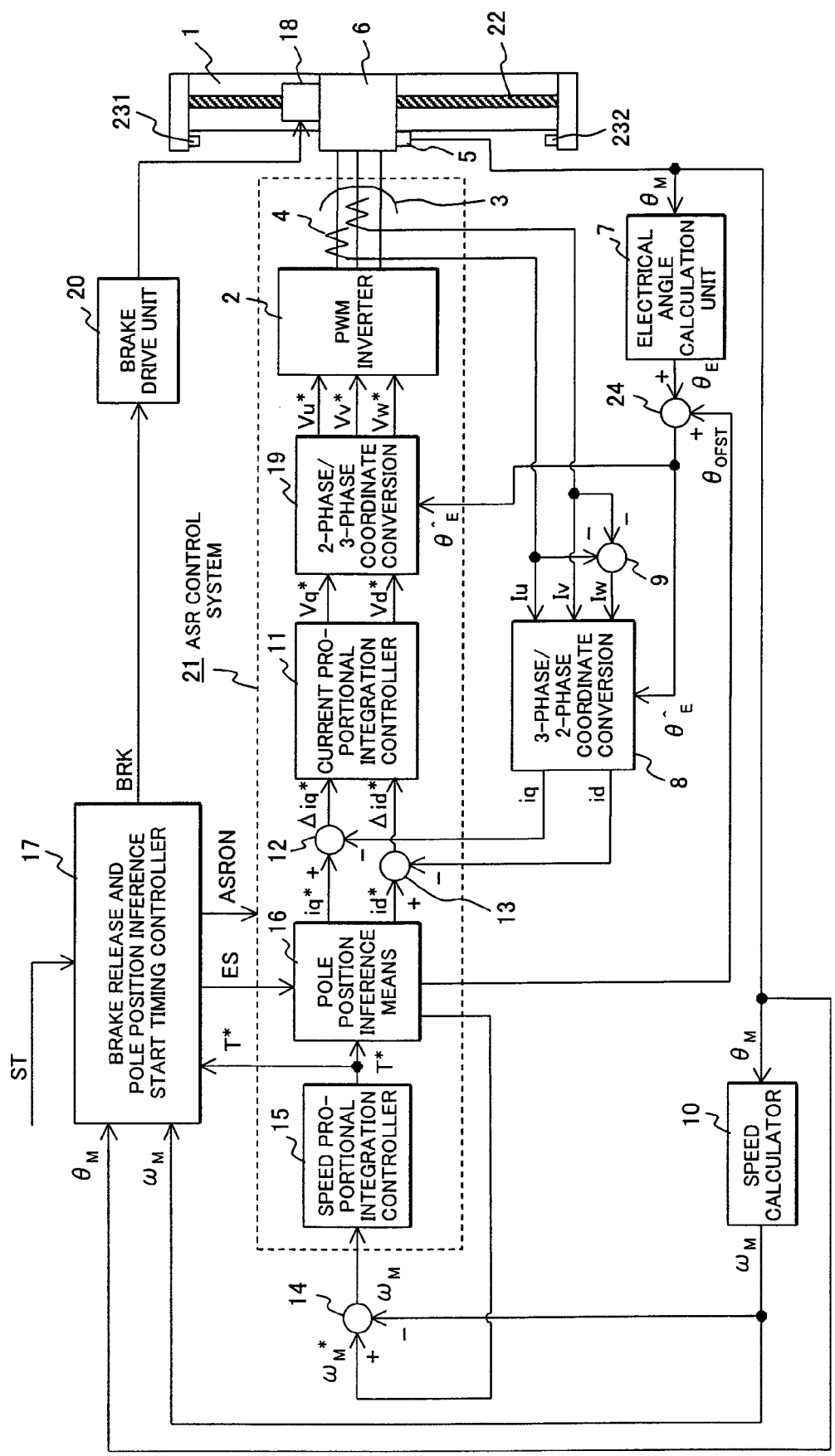
FIG. 1 is a schematic view of the whole control system of the control apparatus of the synchronous motor common to the embodiments of the present invention.

FIG. 1 is a schematic view of the whole control system of the control apparatus of the synchronous motor common to the following embodiments of the present invention. To a linear synchronous motor 1, a 3-phase AC voltage is applied from a PWM inverter 2 via motor cables 3. A current detector 4, among the 3-phase AC current flowing through the linear synchronous motor 1 via the cables 3, detects 2-phase currents Iu and Iv. A position sensor 5 generates a pulse train according to a movement distance of $\theta_M$ of a moving part 6 of the linear synchronous motor 1. An electrical angle calculation unit 7 counts the output pulse of the position sensor 5 and calculates a pre-correction electrical angle of $\theta_E$ of the moving part 6. The pre-correction electrical angle $\theta_E$ and an electrical angle correction value of $\theta_{OFST}$ which will be described later are added by an adder 24 and a post-correction electrical angle of $\theta_E$ is obtained. On the basis of the post-correction electrical angle $\theta_E$, a 3-phase/2-phase coordinate conversion unit 8 converts the detection currents Iu and Iv and Iw obtained as an output of an adder 9 to a q-axial current detection value iq and a d-axial current detection value id. A speed calculator 10 calculates a moving speed of $\omega_M$ of the moving part 6 from the movement distance of $\theta_M$ of the moving part 6. Here, the speed in the upward direction is assumed as a positive polarity speed and the speed in the downward direction is assumed as a negative polarity speed. A q-axial current instruction value iq* which is an output value of a pole position inference means 16 and a q-axial current detection value iq are input to a subtracter 12, which calculates a deviation $\Delta iq^* = (iq^* - iq)$ of those values. On the other hand, similarly, a d-axial current instruction value id* which is an output value of the pole position inference means 16 and a d-axial current detection value id are input to a subtracter 13, which calculates a deviation $\Delta id^* = (id^* - id)$ of those values. The deviations $\Delta iq^*$ and $\Delta id^*$ are input to a current proportional integration controller 11, which executes proportional integration control and outputs 2-phase instruction voltages Vq* and Vd*. A subtracter 14 calculates a deviation between a speed instruction value of ($\omega_M^*$ and the speed detection value $\omega_M$ and a speed proportional integration controller (ASR control system) 15 calculates a thrust instruction value T*. With respect to the polarity of the thrust instruction value T*, the upward thrust has positive polarity and the downward thrust has negative polarity. The pole position inference means 16, using a pole position inference process start flag ES outputted from a brake release and pole position inference start timing controller 17 as a start trigger, starts the pole position inference process and outputs the speed instruction value $\omega_M^*$ for pole position inference to the subtracter 14. Further, at the point of time when the pole position inference is completed, the pole position inference means 16 outputs the electrical angle correction value of $\theta_{OFST}$ which is equal in magnitude to the electrical angle error included in the pre-correction electrical angle of $\theta_E$ and has a reverse sign. Further, with respect to the detailed process of the pole position inference means 16, for example, the method described in Patent Document 1 can be used.

The brake release and pole position inference start timing controller 17 inputs a start signal ST and the movement distance $\theta_M$ of the moving part 6 or the moving speed $\omega_M$ or the thrust instruction value T*. And, the controller 17 outputs the pole position inference process start flag ES and also a brake apply and release instruction BRK for a brake drive unit 20 and an ASR control system ON instruction ASRON for activating an ASR control system 21 enclosed by a dashed line. A 2-phase/3-phase coordinate conversion unit 19, using the post-correction electrical angle $\theta_E$, converts the 2-phase instruction voltages Vq* and Vd* to 3-phase voltage instruction values Vu*, Vv* and Vw* and outputs them to the PWM inverter 2.

The control block drawn shows only the controllers activated in pole position inference and during the actual operation after end of the inference process, a control system composed of a large loop of a position servo control system not drawn is formed generally.

In the drive system, a rail 22 for linear movement of the moving part 6 is used also as a subject to which a brake shoe of a brake 18 is pressed at the time of braking. Buffers 231 and 232 at the upper and lower ends ease a shock when the moving part 6 reaches the ends of the moving area.

Figure 2:
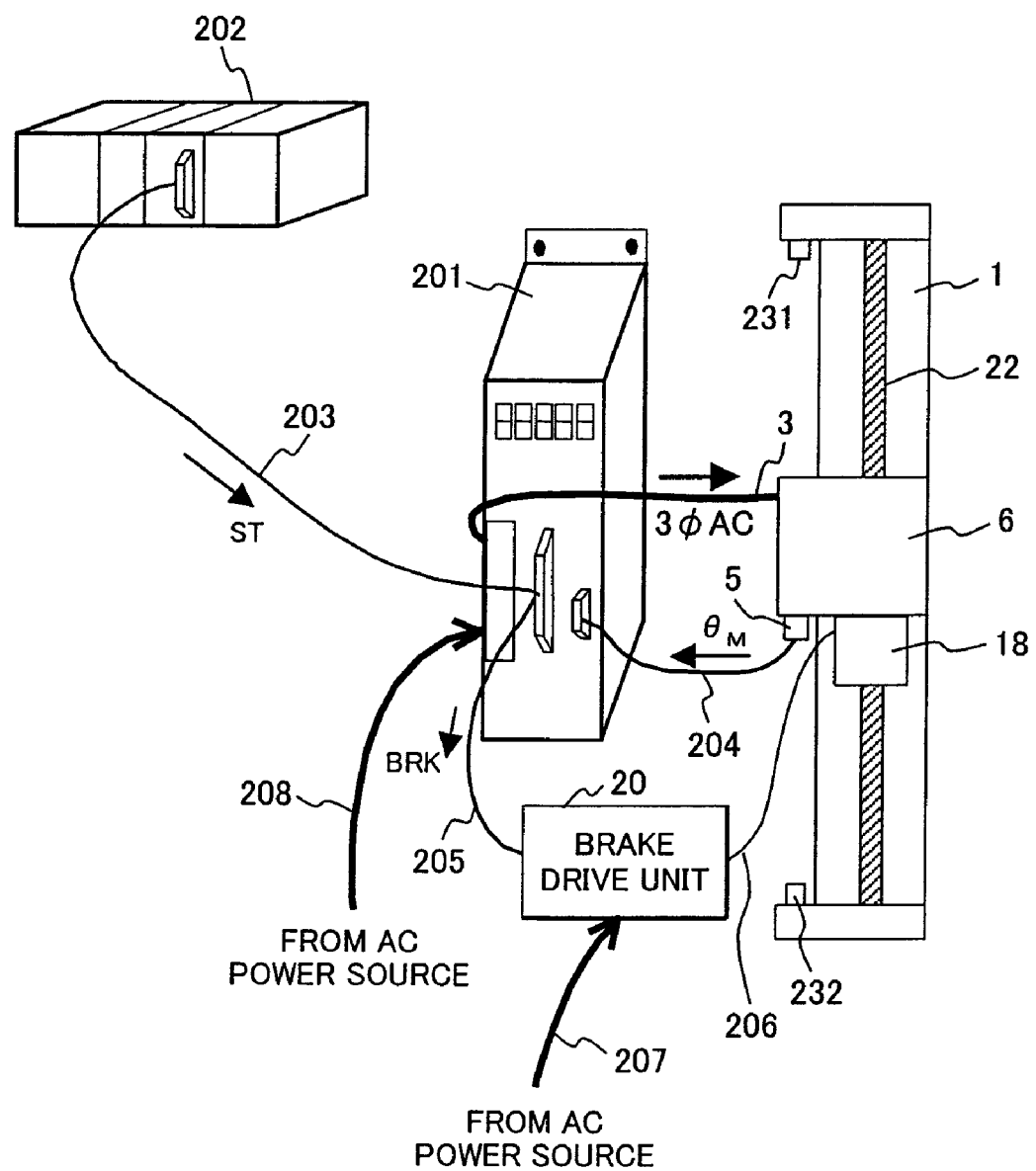
FIG. 2 is a schematic view of the hardware of the control apparatus of the synchronous motor common to the embodiments of the present invention.

FIG. 2 is a hardware block diagram common to the following embodiments of the present invention. In FIG. 2, to a servo amplifier 201, via an instruction cable 203 from a host controller 202, the start signal ST is issued to the brake release and pole position inference start timing controller 17. The movement distance $\theta_M$ of the moving part 6 of the linear synchronous motor 1 is detected by the position sensor 5 and is transmitted as a pulse train to the servo amplifier 201 via a cable 204. Motor drive power 3φAC outputted by the servo amplifier 201 is supplied to the linear synchronous motor 1 via the motor cable 3. The brake apply and release instruction BRK issued by the servo amplifier 201 is transmitted to the brake drive unit 20 via a brake instruction cable 205. The brake drive unit 20, according to the brake apply and release instruction BRK, via a brake drive cable 206, controls to turn on or off an exciting current supplied to the brake shoe driving magnetic circuit of the brake 18 fixed to the moving part 6. A cable 207 is a power cable of the brake drive unit 20, and a cable 208 is a power cable of the servo amplifier 201, and the cables are respectively connected to the AC power source. In the drawing, the power lines are indicated by a thick line and the signal lines are indicated by a thin line. The PWM inverter 2, current detector 4, electrical angle calculation unit 7, numerals 8 to 17, 2-phase/3-phase coordinate conversion unit 19, and ASR control system 21 which are shown in FIG. 1 are control units built in the servo amplifier 201.

Figure 3:
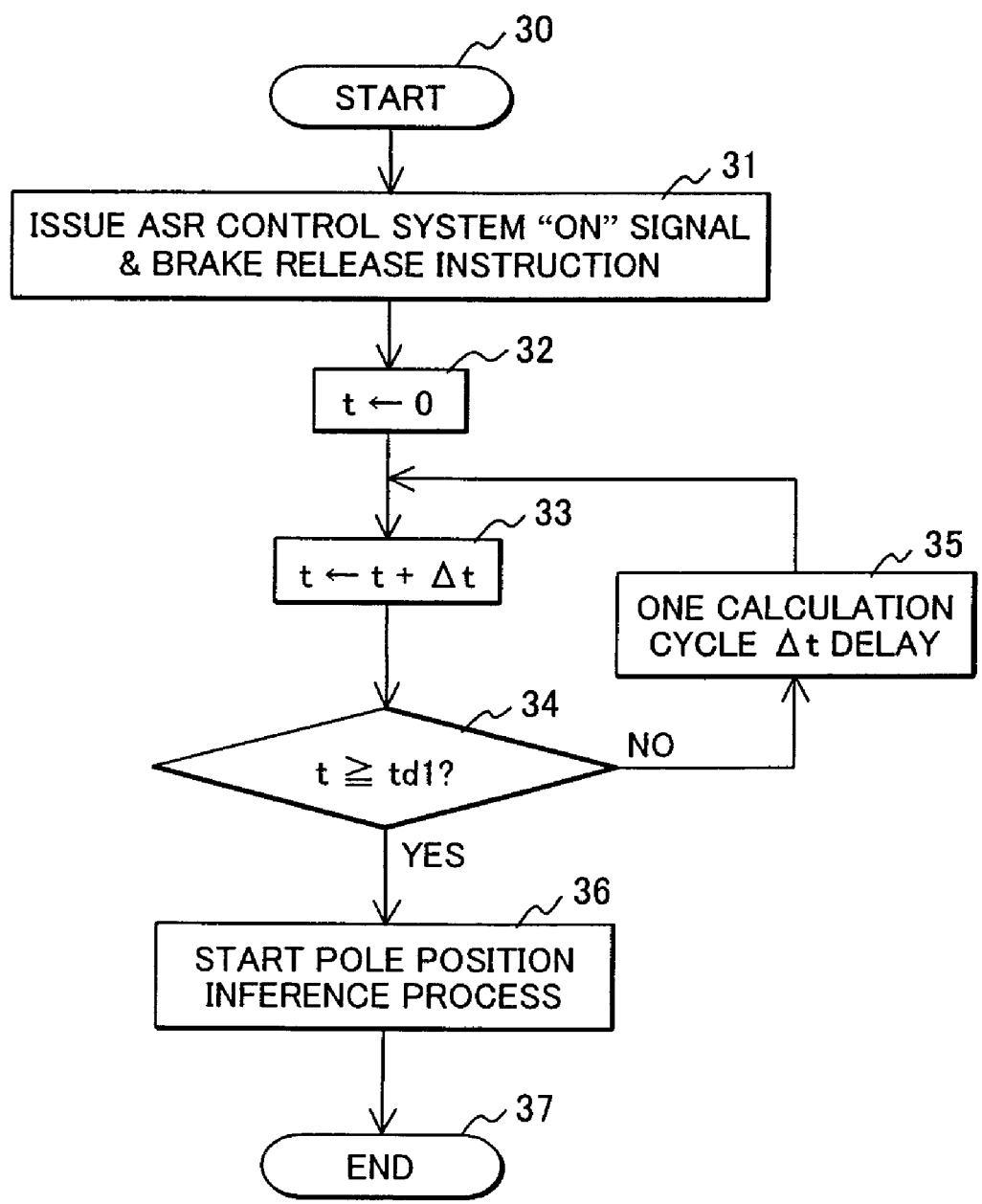
FIG. 3 is a flow chart of the pole position inference start timing decision process of the first embodiment of the present invention.
Figure 4:
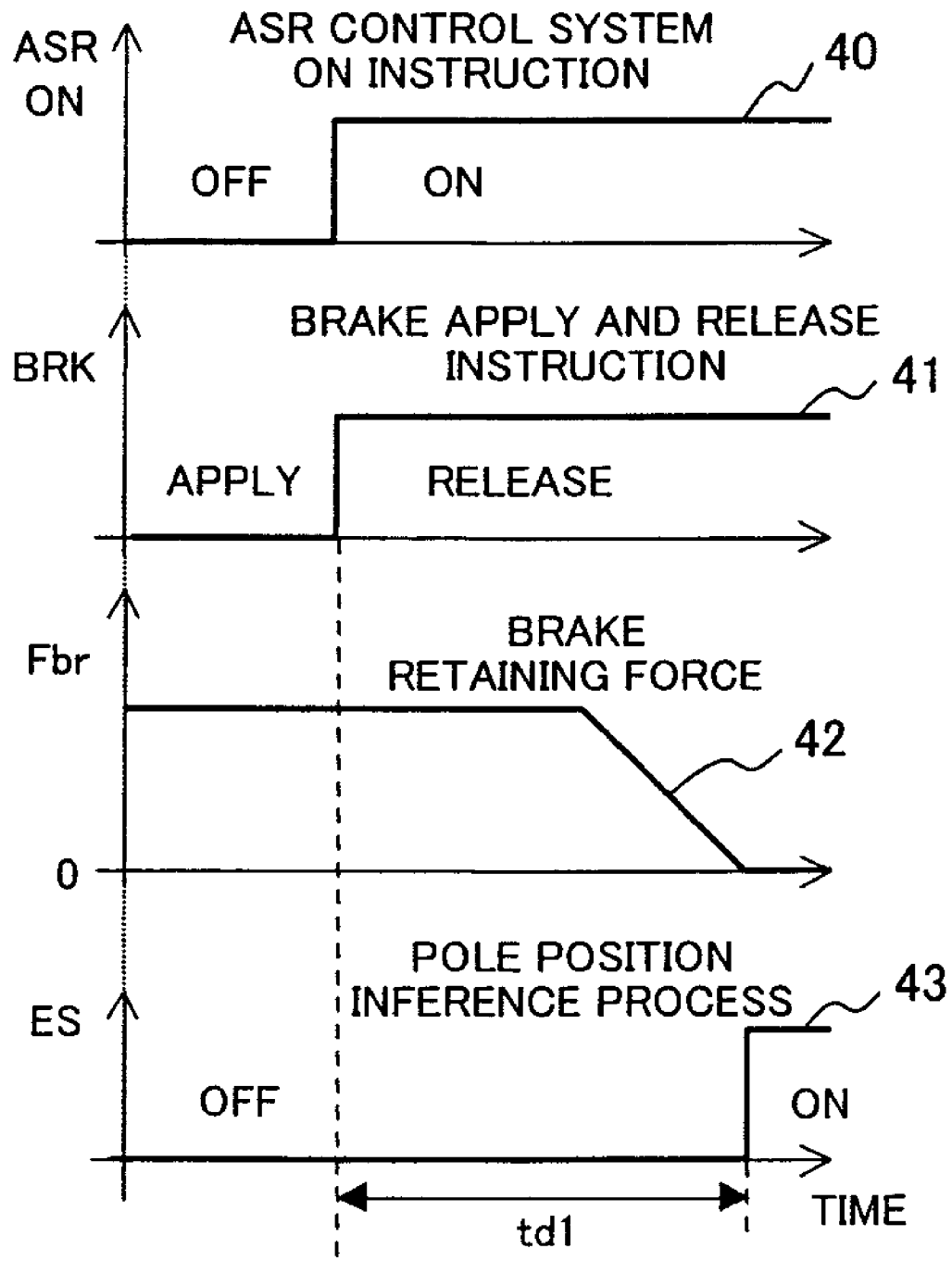
FIG. 4 is a time chart showing the situation of the operation of the first embodiment of the present invention.

FIG. 3 is a processing flow of the brake release and pole position inference start timing controller 17 of the first embodiment of the present invention and FIG. 4 is a time chart for explaining the operation thereof.

When starting the synchronous motor 1 having no pole position sensor, it is necessary to perform first the pole position inference process. As described above, unless the brake is released at appropriate timing, the inference process is started in the brake retaining state and a problem arises that a normal pole position inference process cannot be performed. Further, for example, in a system for driving vertically, when the brake is released extremely earlier than start of the process of the pole position inference means 16, falling (runaway) is caused and it is already described that a problem arises that the falling (runaway) distance is increased due to the detection delay. Therefore, the completion time of release of the brake 18 must coincide with the start time of the inference process of the pole position inference means 16.

This embodiment uses a means for providing a time adjustment parameter td1 and delaying the start of the pole position inference process by the designated time td1 for the brake release instruction. In the processing flow shown in FIG. 3, when starting the pole position inference process, to the servo amplifier 201, the start signal ST is input directly or indirectly from a user or the host controller 202 shown in FIG. 2, thus a start process 30 is started. Further, it is a prior condition for the processing flow to execute halfway the preceding cycle at a frequency of N times per second.

When the start process 30 is started, firstly, "ASR control system ON and brake release instruction issue" at Step 31 is executed unconditionally. At Step 31, an ASR control system ON signal ASRON is set in the on state and the ASR control system 21 enclosed by the dashed line in FIG. 1 is activated. Simultaneously, the brake apply and release instruction BRK is changed from the OFF state to the ON state and the release of the brake 18 is started. Next, at Step 32, a timer variable t for time measurement is cleared to 0 and the process goes to Step 33. At Step 33, the timer variable t is added with one calculation cycle Δt and the process goes to the decision Step 34. At the decision Step 34, whether t≧td1 is held or not is decided and when it is not held, the process goes to Step 35. At Step 35, a one calculation cycle Δt delay process is performed. On the other hand, when the decision condition is held at the decision Step 34, the process goes to Step 36. At Step 36, the pole position inference process start flag ES is set into the ON state and the process goes to the end Step 37.

As mentioned above, the processing flow shown in FIG. 3 is executed, thus after the ASR control system ON instruction ASRON and the ON instruction of the brake apply and release instruction BRK are issued, after the time td1, the pole position inference process start flag ES is changed from the OFF state to the ON state and the pole position inference process is started.

FIG. 4 is a time chart showing the situation of the operation at this time. An ASR control system ON instruction 40 indicates the ASRON state and corresponds to the ASR OFF instruction on the Low level and to the ASR ON instruction on the High level. A brake apply and release instruction 41 is a waveform indicating the BRK state and corresponds to the brake apply instruction on the Low level and to the brake release instruction on the High level. Numeral 42 indicates a waveform indicating brake retaining force Fbr and after the brake apply and release instruction BRK goes high, maintains the brake retaining force Fbr for a while, and the brake retaining force Fbr starts soon to lower to zero. Numeral 43 indicates a waveform indicating the state of the pole position inference process start flag ES and when the flag ES goes high, the pole position inference process is started. The waveform 43, by execution of the process flow shown in FIG. 3, after the brake apply and release instruction BRK is changed to the high level, after td1, is changed to the high level. Therefore, when td1 is properly set, the brake retaining force Fbr 42 is reduced to zero and simultaneously the pole position inference process can be started. Concretely, as a time adjustment parameter td1, by reference to the specification of the brake 18 or by actual measurement, the time from issue of the brake release instruction to actual reduction of the brake retaining force Fbr to zero is obtained and the time is set.

As mentioned above, according to this embodiment, failure in the pole position inference due to start of the inference process in the brake retaining state, excessive falling of the moving part due to impossible immediate start of the pole position inference process after release of the brake, and failure in the pole position inference due to it can be prevented.

In the first embodiment, the time adjustment parameter td1 is provided and a means for delaying the start of the pole position inference process by the designated time td1 for the brake release signal is used. Therefore, it is effective when the time from issue of the brake release instruction to actual reduction of the brake retaining force Fbr to zero is always fixed. However, due to frictional wear of the brake shoe of the brake 18, a difference in the lubrication condition for each part of the rail 22 which is a subject to which the brake shoe is pressed, and variations in each article, the operation delay of the brake varies in the short term or the long term or with each article.

Therefore, in the second embodiment of the present invention, after issue of the brake release instruction, the condition that the brake retaining force is reduced sufficiently is indirectly detected from the thrust instruction value T* and the start timing of the pole position inference process is decided.

Figure 5:
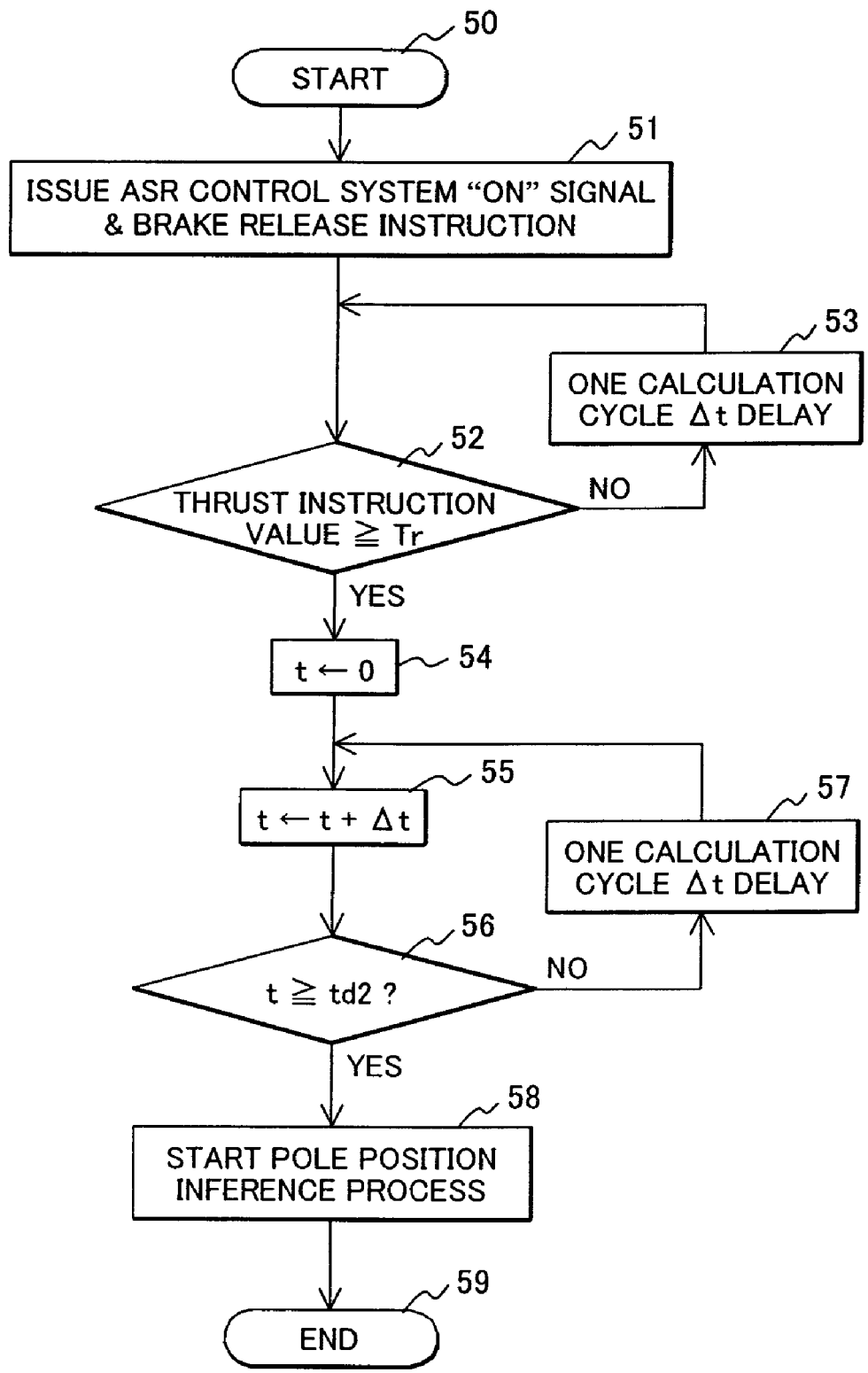
FIG. 5 is a flow chart of the pole position inference start timing decision process of the second embodiment of the present invention.
Figure 6:
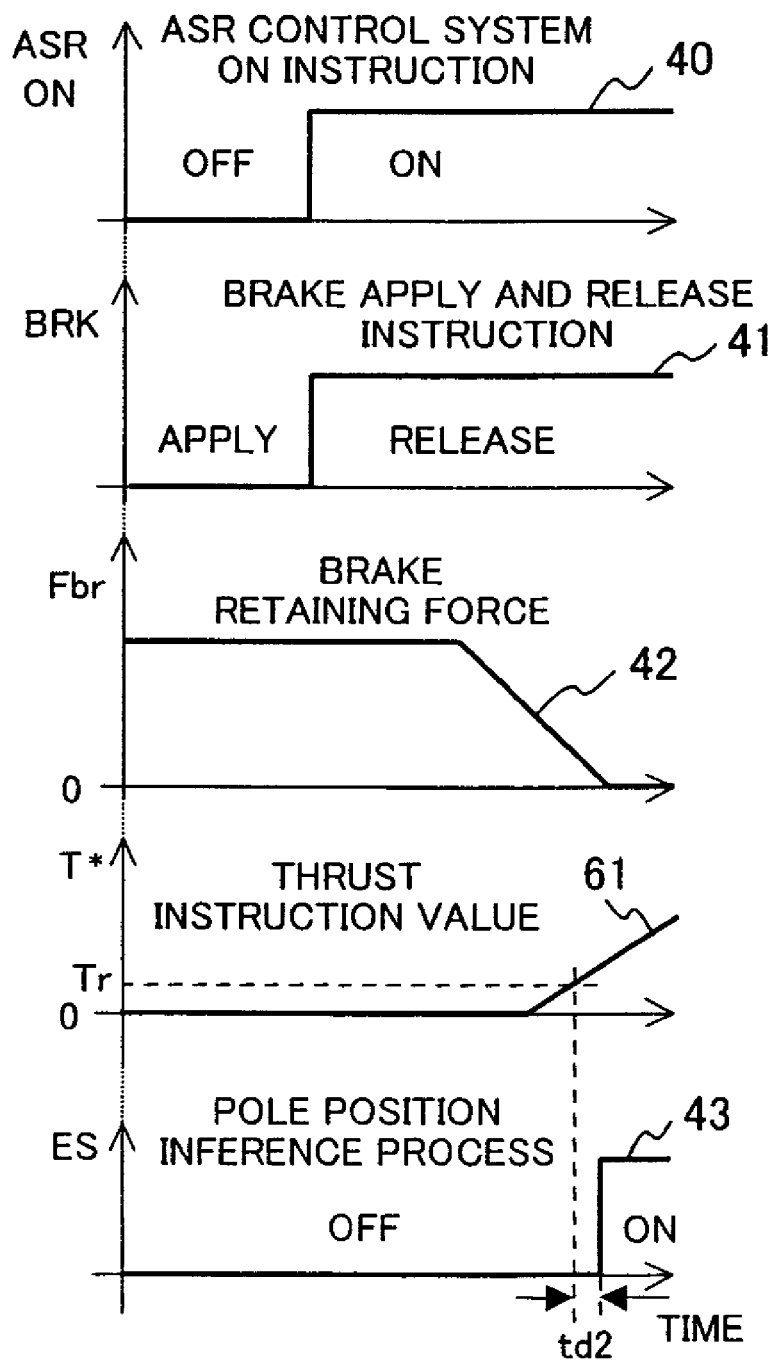
FIG. 6 is a time chart showing the situation of the operation of the second embodiment of the present invention.

FIG. 5 is a processing flow of the brake release and pole position inference start timing controller 17 of the second embodiment of the present invention and FIG. 6 is a time chart for explaining the operation thereof.

The processing flow shown in FIG. 5, in the same way as with FIG. 3, indicates a start process 50, when starting the pole position inference process, which is started by direct or indirect input of the start signal ST from a user or the host controller 202 shown in FIG. 2. The start Step 50 is a starting point of the processing flow and the process unconditionally moves to the "ASR control system ON and brake release instruction issue" Step 51. At the "ASR control system ON and brake release instruction issue" Step 51, the ASR control system ON signal ASRON is set in the ON state and the ASR control system 21 enclosed by the dashed line in FIG. 1 is activated. Simultaneously, the brake apply and release instruction BRK is changed from the OFF state to the ON state, thus the release of the brake 18 is started and the process goes to the judgment Step 52. At the judgment Step 52, whether the thrust instruction value $T^* \geq T_r$ is held or not is decided and when it is not held, the process goes to Step 53. At Step 53, the one calculation cycle Δt delay process is performed. On the other hand, when the decision condition is held at the decision Step 52, the process goes to Step 54. At Step 54, the timer variable t for time measurement is cleared to 0 and the process goes to Step 55. At Step 55, the timer variable t is added with Δt and the process goes to the decision Step 56. At the decision Step 56, whether t≧td2 is held or not is decided and when it is not held, the process goes to Step 57. At Step 57, the one calculation cycle Δt delay process is performed. On the other hand, when the decision condition is held at the decision Step 56, the process goes to Step 58. At Step 58, the pole position inference process start flag ES is set into the ON state and the process goes to the end Step 59.

As mentioned above, the processing flow shown in FIG. 5 is executed, thus after the ASR control system ON instruction ASRON and the release instruction of the brake apply and release instruction BRK are issued, the thrust instruction value T* is monitored at a frequency of N times per second. And, after the designated time td2 from the point of time when the thrust instruction value T* exceeds the predetermined thrust value $T_r$, the pole position inference process start flag ES is changed from the OFF state to the ON state and the pole position inference process is started.

FIG. 6 is a time chart showing the situation of the operation at this time. Numeral 61 indicates a waveform indicating the thrust instruction value T* and the other waveforms are as explained already in FIG. 4. When Step 51 shown in FIG. 5 is executed, the ASR control system ON instruction ASRON indicated by the waveform 40 and the brake apply and release instruction BRK indicated by the waveform 41 are changed from the Low level to the High level. Then, the brake retaining force Fbr indicated by the waveform 42 starts to reduce after a while. When the brake retaining force Fbr becomes smaller than the gravity applied to the moving part 6, the moving part 6 starts falling. At this time, to the speed proportional integration controller 15 shown in FIG. 1, a positive value is input and the thrust instruction value T* which is output thereof starts to increase from zero. And, after td2 from the point of time when the thrust instruction value T* exceeds the predetermined thrust value $T_r$, the pole position inference process start flag ES is changed to the ON state. Here, how to decide the predetermined thrust value $T_r$ and the designated time td2 will be explained. Concretely, they are obtained by experimentation and to suppress the falling distance, a policy of setting $T_r$ as small as possible is adopted. However, when $T_r$ is made extremely small, due to vibration applied to the moving part 6 and noise to the signal line of the position sensor 5, a malfunction is caused. Therefore, outside the range of the influence, $T_r$ is set small. Next, in the decision of the designated time td2, the start-up inclination of the thrust instruction value T*, as the absolute value of the electrical angle correction value $\theta_{OFST}$ which is to be inferred hereafter increases, is apt to be sharp. Therefore, to set the pole position inference process start flag ES into the ON state at the point where the brake retaining force Fbr is reduced to zero, if $T_r$ is fixed, strictly, it is necessary to change the designated time td2 according to an unknown electrical angle correction value $\theta_{OFST}$. However, it is impossible actually, so that the pole position inference process is executed under a plurality of conditions of different electrical angle correction values $\theta_{OFST}$ and the designated time td2 obtaining a best result is adopted.

As mentioned above, according to this embodiment, regardless of differences in the release time of an individual brake, the lubrication condition of the rail at each stop position, and the release time due to a change with time, the pole position inference process can be started simultaneously with release of the brake. By doing this, failure in the pole position inference due to start of the inference process in the brake retaining state, excessive falling of the moving part due to impossible immediate start of the pole position inference process after release of the brake, and failure in the pole position inference due to it can be prevented.

Figure 7:
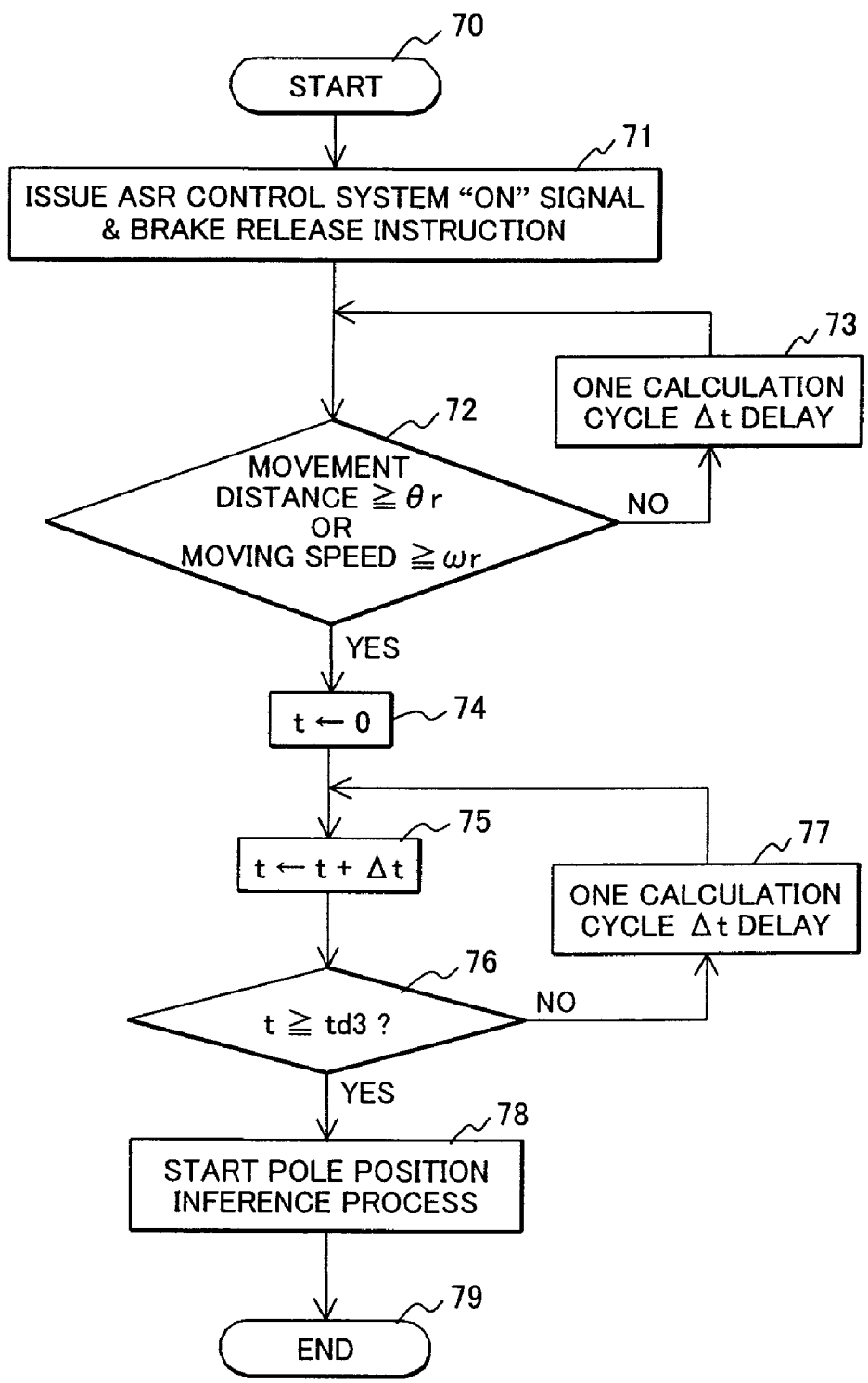
FIG. 7 is a flow chart of the pole position inference start timing decision process of the third embodiment of the present invention.
Figure 8:
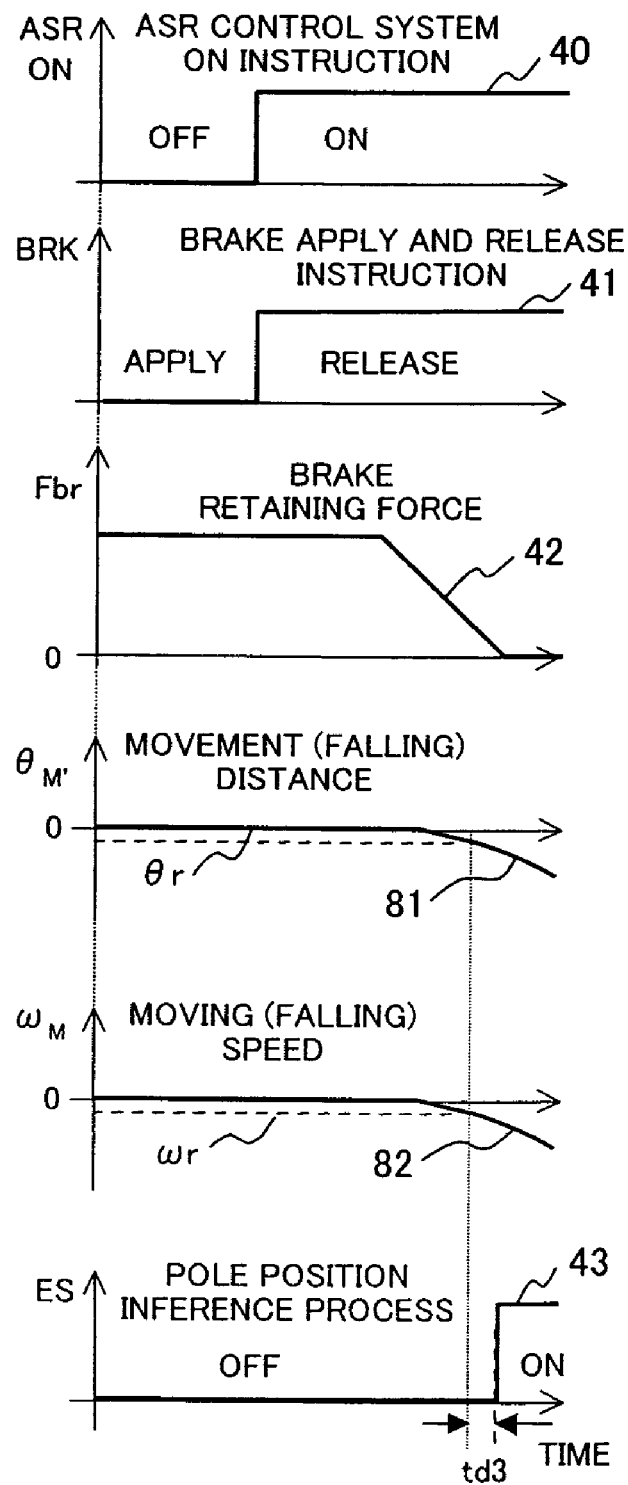
FIG. 8 is a time chart showing the situation of the operation of the third embodiment of the present invention.

FIG. 7 is a processing flow of the brake release and pole position inference start timing controller 17 of the third embodiment of the present invention and FIG. 8 is a time chart for explaining the operation thereof.

In this embodiment, the same function as that of the embodiment shown in FIG. 5 is realized using detection results of the movement (falling) distance or moving (falling) speed instead of the thrust instruction value T*. Firstly, in the same way as with the processing flow of the preceding embodiment, when starting the pole position inference process, the start signal ST is input directly or indirectly from a user or the host controller 202 shown in FIG. 2, thus the pole position inference process is started at the start Step 70. The start Step 70 is a starting point of the processing flow and the process unconditionally moves to the "ASR control system ON and brake release instruction issue" Step 71. At the "ASR control system ON and brake release instruction issue" Step 71, the ASR control system ON signal ASRON is set in the ON state and the ASR control system 21 enclosed by the dashed line in FIG. 1 is activated. Simultaneously, the brake apply and release instruction BRK is changed from the release state to the apply state, thus the release of the brake 18 is started and the process goes to the judgment Step 72. At the judgment Step 72, whether the movement distance $\theta_M \geq \theta_r$ or the moving speed $\omega_M \geq \omega_r$ is held or not is decided and when it is not held, the process goes to Step 73. At Step 73, the one calculation cycle Δt delay process is performed. On the other hand, when the decision condition is held at the decision Step 72, the process goes to Step 74. At Step 74, the timer variable t for time measurement is cleared to 0 and the process goes to Step 75. At Step 75, the timer variable t is added with Δt and the process goes to the decision Step 76. At the decision Step 76, whether t≧td3 is held or not is decided and when it is not held, the process goes to Step 77. At Step 77, the one calculation cycle Δt delay process is performed. On the other hand, when the decision condition is held at the decision Step 76, the process goes to Step 79. At Step 79, the pole position inference process start flag ES is set into the ON state and the process goes to the end Step 79.

As explained above, the processing flow shown in FIG. 7 is executed, thus after the ASR control system ON instruction ASRON and the release instruction of the brake apply and release instruction BRK are issued, the movement distance $\theta_M$ or the moving speed $\omega_M$ of the moving part 6 is monitored at a frequency of N times per second and after the designated time td3 from the point of time when the moving part 6 falls longer than $|\theta_r|$ or has a falling speed of higher than $|\omega_r|$, the pole position inference process start flag ES is changed from the OFF state to the ON state and the pole position inference process is started.

FIG. 8 is a time chart showing the situation of the operation at this time. Numerals 81 and 82 indicate respectively waveforms indicating the movement distance $\theta_M$ and the moving speed $\omega_M$ and the other waveforms are as explained already in FIG. 4. When Step 71 shown in FIG. 7 is executed, the ASR control system ON instruction ASRON indicated by the waveform 40 and the brake apply and release instruction BRK indicated by the waveform 41 are changed from the Low level to the High level. Then, the brake retaining force Fbr indicated by the waveform 42 starts to reduce after a while. When the brake retaining force Fbr becomes smaller than the gravity applied to the moving part 6, the moving part 6 starts falling. And, after time td3 from the point of time when the movement distance $\theta_M$ exceeds $\theta_r$ or the moving speed $\omega_M$ exceeds $\omega_r$, the pole position inference process start flag ES is changed to the ON state. Here, how to decide the predetermined movement distance $\theta_r$, the predetermined moving speed $\omega_r$, and the designated time td3 will be explained. Concretely, similarly to the preceding embodiment, they are obtained from experimentation and to suppress the falling distance, a policy of setting $|\theta_r|$ or $|\omega_r|$ as small as possible is adopted. However, when $|\theta_r|$ or $|\omega_r|$ is made extremely small, due to vibration applied to the moving part 6 and noise to the signal line of the position sensor 5, a malfunction is caused. Therefore, outside the range of the influence, $|\theta_r|$ or $|\omega_r|$ is set small. Next, in the decision of the designated time td3, the acceleration of the moving part 6 in the falling direction, as the absolute value of the electrical angle correction value $\theta_{OFST}$ which is to be inferred hereafter increases, is apt to increase. The reason is that as the absolute value of the electrical angle correction value $\theta_{OFST}$ increases, the speed control system 21 enclosed by the dashed line shown in FIG. 1 cannot generate efficiently the upward thrust against the gravity applied to the moving part 6. Therefore, to set the pole position inference process start flag ES into the ON state at the point where the brake retaining force Fbr is reduced to zero, if $\theta_r$ or $\omega_r$ is fixed, strictly, it is necessary to change the designated time td3 according to an unknown electrical angle correction value $\theta_{OFST}$. However, it is impossible actually, so that the pole position inference process is executed under a plurality of conditions of different electrical angle correction values $\theta_{OFST}$ and the designated time td3 obtaining a best result is adopted.

As explained above, according to this embodiment, regardless of differences in the release time of an individual brake, the lubrication condition of the rail at each stop position, and the release time due to a change with time, the pole position inference process can be started simultaneously with release of the brake. By doing this, failure in the pole position inference due to start of the inference process in the brake retaining state, excessive falling of the moving part due to impossible immediate start of the pole position inference process after release of the brake, and failure in the pole position inference due to it can be prevented.

Further, at Step 71 shown in FIG. 7, the ASR control system ON instruction is issued simultaneously with issue of the brake release instruction and the ASR control system 21 shown in FIG. 1 is activated. However, the ASR control system 21, at Step 78, may be activated simultaneously with turning on the pole position inference process.

Figure 9:
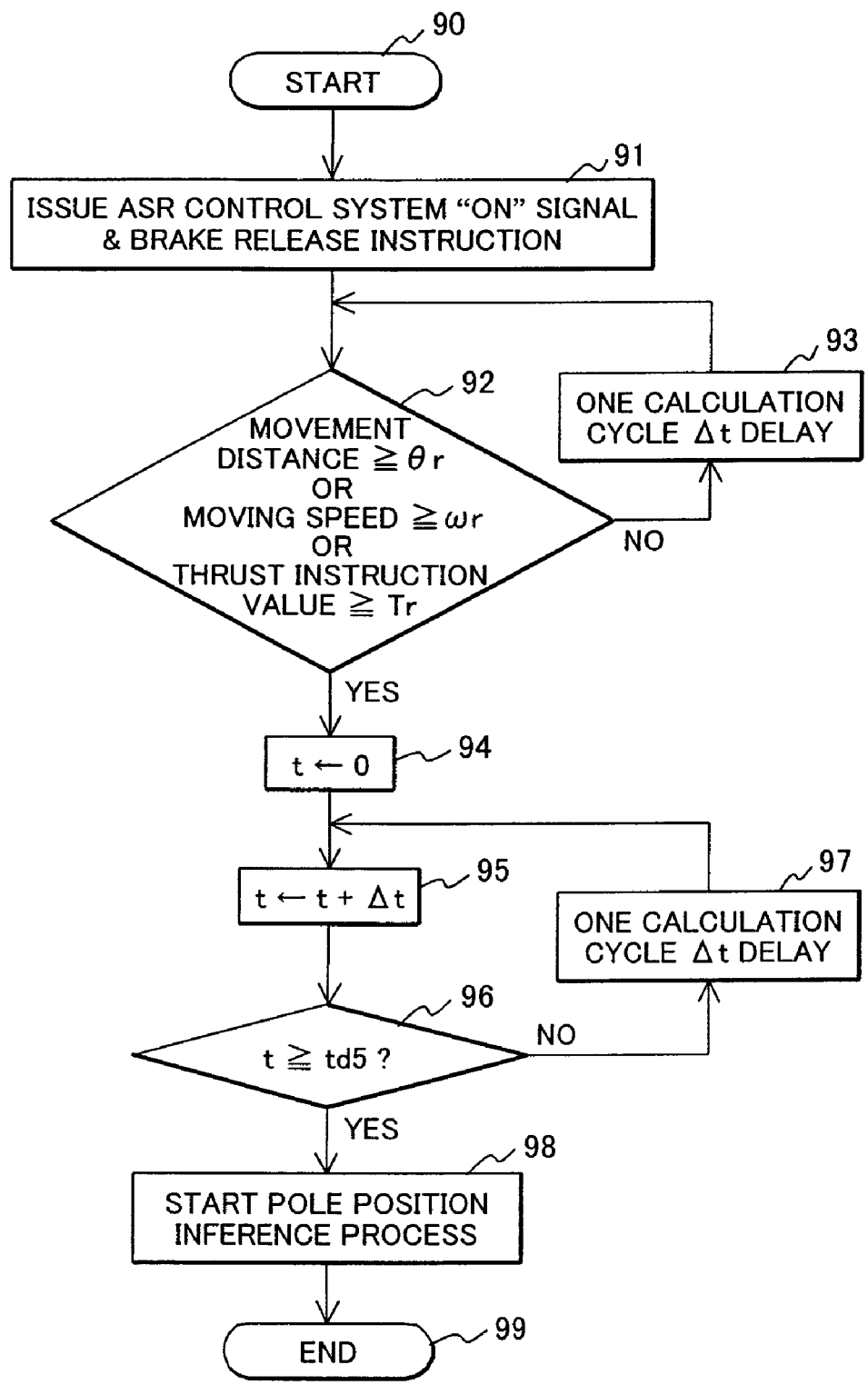
FIG. 9 is a flow chart of the pole position inference start timing decision process of the fourth embodiment of the present invention.
Figure 10:
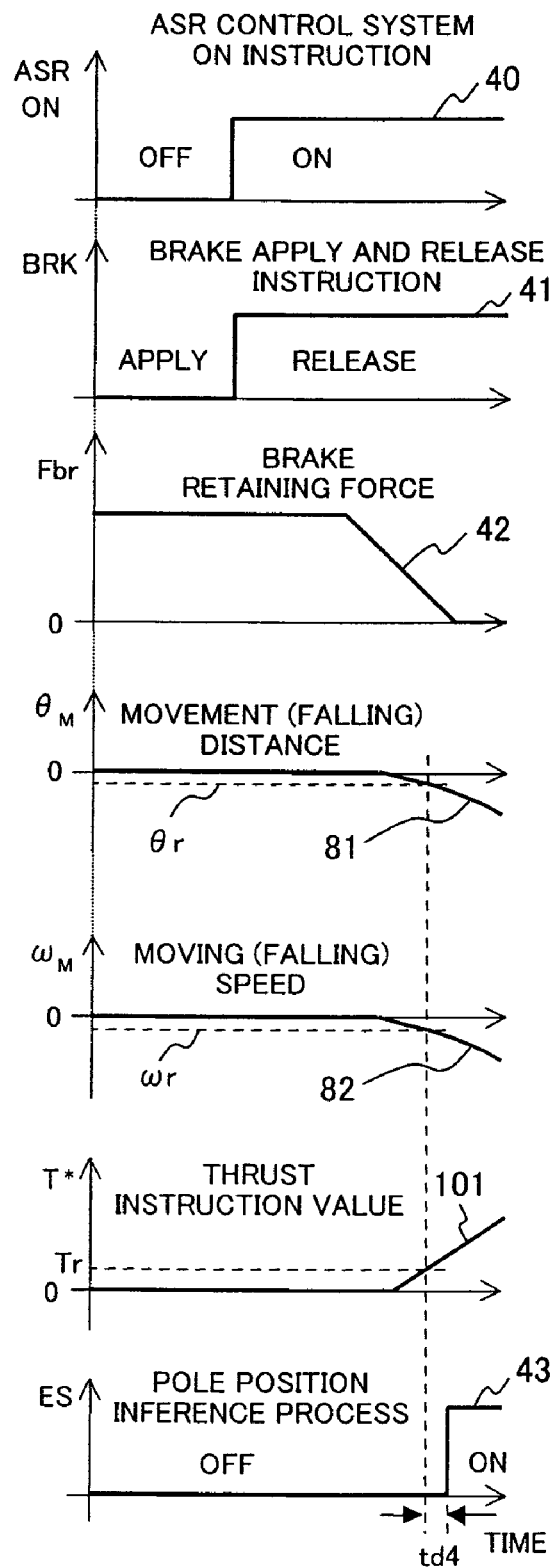
FIG. 10 is a time chart showing the situation of the operation of the fourth embodiment of the present invention.

FIG. 9 is a processing flow of the brake release and pole position inference start timing controller 17 of the fourth embodiment of the present invention and FIG. 10 is a time chart for explaining the operation thereof.

In the aforementioned embodiment, after issue of the brake release instruction, the state that the brake retaining force is reduced sufficiently is detected indirectly from detection results of the falling distance or the falling speed in the ASR control system ON state, thus the start timing of the pole position inference process is decided. On the other hand, in this embodiment, the concerned state is detected using detection results of the falling distance or the falling speed in the ASR control system OFF state.

Similarly to the processing flow shown in FIGS. 2, 4, and 6, when starting the pole position inference process, the start signal ST is input directly or indirectly from a user or the host controller 202 shown in FIG. 2, thus it is started at the start Step 90 and it is executed at a frequency of N times per second. The start Step 90 is a starting point of the flow chart shown in FIG. 9 and the process unconditionally moves to the "ASR control system ON and brake release signal issue" Step 91. At Step 91, the ASR control system 21 is activated, and simultaneously the brake apply and release instruction BRK is changed from the apply state to the release state, thus the release of the brake 18 is started, and the process goes to the judgment Step 92. At the judgment Step 92, whether any of the movement distance $\theta_M \geq \theta_r$, the moving speed $\omega_M \geq \omega_r$, and the thrust instruction value $T^* \geq T_r$ is held or not is decided and when it is not held, the process goes to Step 93. At Step 93, the one calculation cycle $\Delta t$ delay process is performed. On the other hand, when the decision condition is held at the decision Step 92, the process goes to Step 94. At Step 94, the timer variable t for time measurement is cleared to 0 and the process goes to Step 95. At Step 95, the timer variable t is added with $\Delta t$ and the process goes to the decision Step 96. At the decision Step 96, whether $t \geq td4$ is held or not is decided and when it is not held, the process goes to Step 97. At Step 97, the one calculation cycle $\Delta t$ delay process is performed. On the other hand, when the decision condition is held at the decision Step 96, the process goes to Step 98. At Step 98, the ASR control system ON instruction ASRON is set into the ON state, and the ASR control system 21 enclosed by the dashed line shown in FIG. 1 is activated, and simultaneously, the pole position inference process start flag ES is set into the ON state, and the process goes to the end Step 99.

As explained above, the processing flow shown in FIG. 9 is executed, thus after the release instruction of the brake apply and release signal BRK is issued, the movement distance $\theta_M$, the moving speed $\omega_M$, or the thrust instruction value $T^*$ of the moving part 6 is monitored at a frequency of N times per second. And after the designated time td4 from the point of time when the moving part 6 falls longer than $|\theta_r|$ or has a falling speed of higher than $|\omega_r|$ or the thrust instruction value exceeds $T_r$, the pole position inference process start flag ES is changed from the OFF state to the ON state and the pole position inference process is started.

FIG. 10 is a time chart showing the situation of the operation at this time. A waveform 101 is a waveform indicating the thrust instruction value T* and the other waveforms are as explained already in FIG. 8. When Step 91 shown in FIG. 9 is executed, the ASR control system ON instruction ASRON indicated by the waveform 40 and the brake apply and release instruction BRK indicated by the waveform 41 are changed from the Low level to the High level. Then, the brake retaining force Fbr indicated by the waveform 42 starts to reduce after a while. When the brake retaining force Fbr becomes smaller than the gravity applied to the moving part 6, the moving part 6 starts falling. At this time, to the speed proportional integration controller 15 shown in FIG. 1, a positive value is input and the thrust instruction value T* which is output thereof starts to increase practically from zero. And, after time td4 from the point of time when the movement (falling) distance $\theta_M$ exceeds $\theta_r$ or the moving (falling) speed $\omega_M$ exceeds $\omega_r$ or the thrust instruction value T* exceeds the predetermined thrust value $T_r$, the pole position inference process start flag ES indicated by the waveform 43 is changed to the ON state.

Here, how to decide the designated time td4 will be explained. Incidentally, how to decide the predetermined thrust value $T_r$ is the same as that of the second embodiment and how to decide the predetermined movement distance $\theta_r$ or the predetermined moving speed $\omega_r$ is the same as that of the third embodiment. In this embodiment, the pole position inference process is executed while changing only the designated time td4 and the designated time td4 obtaining a best result is adopted.

As explained above, according to this embodiment, regardless of differences in the release time of an individual brake, the lubrication condition of the rail at each stop position, and the release time due to a change with time, the pole position inference process can be started simultaneously with release of the brake. By doing this, failure in the pole position inference due to start of the inference process in the brake retaining state, excessive falling of the moving part due to impossible immediate start of the pole position inference process after release of the brake, and failure in the pole position inference due to it can be prevented.

What is claimed is:

1. A control apparatus for a synchronous motor comprising a PWM power converter for driving said synchronous motor, a brake for stopping and retaining a moving part of said synchronous motor, a brake drive unit for generating a drive signal for instructing said brake to apply or release, and pole position inference means for inferring a pole position of said synchronous motor, wherein said pole position inference means has timing control means for starting said inference process after instruction of brake release to said brake by said drive signal, wherein said pole position inference means has speed instruction means for generating a speed instruction of said moving part which is practically zero before starting said inference process and a speed controller for calculating a thrust instruction value from a relationship between said speed instruction and a speed detection value obtained from a movement distance signal of said moving part and controlling said power converter, and wherein said timing control means starts said inference process by said pole position inference means after generation of said drive signal for instructing said brake release in accordance with excess of said thrust instruction value over a predetermined value.

2. A control method for a synchronous motor including a PWM power converter for driving said synchronous motor, a brake for stopping and retaining a moving part of said synchronous motor, a brake drive unit for generating a drive signal of said brake, and pole position inference means for inferring and calculating a pole position of said synchronous motor, comprising a step of instructing brake release to said brake and a step of starting a pole position inference process by said pole position inference means after instruction of said brake release, further comprising:

generating a speed instruction of said moving part which is practically zero before starting said inference process by said pole position inference means;

calculating a thrust instruction value from a relationship between said speed instruction and a speed detection value obtained from a movement distance signal of said moving part and controlling said power converter; and starting said inference process by said pole position inference means after generation of said drive signal for instructing said brake release in accordance with excess of said thrust instruction value over a predetermined value.

3. A control apparatus for a linear synchronous motor comprising a PWM power converter for driving said linear synchronous motor, a brake for stopping and retaining a moving part of said linear synchronous motor, a brake drive unit for generating a drive signal for instructing said brake to apply or release, and pole position inference means for inferring and calculating a pole position of said synchronous motor, wherein said pole position inference means has timing control means for starting said inference process after instruction of brake release to said brake by said drive signal, wherein said pole position inference means has speed instruction means for generating a speed instruction of said moving part which is practically zero before starting said inference process and a speed controller for calculating a thrust instruction value from a relationship between said speed instruction and a speed detection value obtained from a movement distance signal of said moving part and controlling said power converter, and wherein said timing control means starts said inference process by said pole position inference means after generation of said drive signal for instructing said brake release in accordance with excess of said thrust instruction value over a predetermined value.

* * * * *